(12) United States Patent
Lin

(10) Patent No.: US 10,237,943 B2
(45) Date of Patent: Mar. 19, 2019

(54) RING-SHAPED LIGHT-EMITTING HEAT-DISSIPATING FAN

(71) Applicant: THERMALTAKE TECHNOLOGY CO., LTD., Taipei (TW)

(72) Inventor: Pei-Hsi Lin, Taipei (TW)

(73) Assignee: THERMALTAKE TECHNOLOGY CO., LTD. (TW)

( * ) Notice: Subject to any disclaimer, the term of this patent is extended or adjusted under 35 U.S.C. 154(b) by 60 days.

(21) Appl. No.: 15/434,241

(22) Filed: Feb. 16, 2017

(65) Prior Publication Data

US 2018/0163960 A1 Jun. 14, 2018

(30) Foreign Application Priority Data

Dec. 8, 2016 (TW) .............................. 105218791 U

(51) Int. Cl.
*H05B 33/08* (2006.01)
*G06F 1/20* (2006.01)
*F04D 19/00* (2006.01)

(52) U.S. Cl.
CPC ....... *H05B 33/0857* (2013.01); *F04D 19/002* (2013.01); *G06F 1/20* (2013.01)

(58) Field of Classification Search
CPC ............ F21V 33/0096; H05B 33/0857; H05K 7/20172; G06F 1/20; F04D 19/002
USPC ......................................................... 362/96
See application file for complete search history.

(56) References Cited

U.S. PATENT DOCUMENTS

| | | | |
|---|---|---|---|
| 2004/0136163 A1* | 7/2004 | Horng | H01L 23/467 361/719 |
| 2007/0025080 A1* | 2/2007 | Li | F04D 29/30 361/695 |
| 2010/0259934 A1* | 10/2010 | Liu | F21V 29/02 362/294 |
| 2013/0235610 A1* | 9/2013 | Yang | F21V 33/004 362/555 |
| 2014/0043810 A1* | 2/2014 | Jo | H05B 37/0272 362/235 |
| 2015/0097666 A1* | 4/2015 | Boyd | F24F 11/30 340/517 |

\* cited by examiner

*Primary Examiner* — Andrew J Coughlin
*Assistant Examiner* — Meghan K Ulanday
(74) *Attorney, Agent, or Firm* — Schmeiser, Olsen & Watts, LLP

(57) ABSTRACT

A ring-shaped light-emitting heat-dissipating fan comprises a base having a ring-shaped frame and a pivot portion; a fan pivotally disposed at the pivot portion; a ring-shaped light guide having an upper top surface, a lower top surface, an inner lateral surface, and an outer lateral surface; a lid disposed on the ring-shaped frame, with the ring-shaped light guide disposed between the base and the lid, and a receiving space formed between the lid and the ring-shaped light guide; and a ring-shaped circuit board disposed on an upper top surface of the ring-shaped light guide in the receiving space and having thereon a plurality of light-emitting elements arranged annularly. Therefore, the ring-shaped flat region dispenses with any receiving recesses for receiving the light-emitting elements. The ring-shaped circuit board controls color of light emitted from the light-emitting elements and their light emission cycles.

7 Claims, 3 Drawing Sheets

RING-SHAPED LIGHT-EMITTING HEAT-DISSIPATING FAN

CROSS-REFERENCE TO RELATED APPLICATION

This non-provisional application claims priority under 35 U.S.C. § 119(a) on Patent Application No(s). 105218791 filed in Taiwan, R.O.C. on Dec. 8, 2016, the entire contents of which are hereby incorporated by reference.

FIELD OF THE INVENTION

The present invention relates to heat-dissipating fans and, more particularly, to a ring-shaped light-emitting heat-dissipating fan.

BACKGROUND OF THE INVENTION

With computers being increasingly popular with users, the general public looks forward to computers which look special and stylish. Commercially available heat-dissipating fans come with light-emitting elements for decorative purposes, thereby dissipating heat as well as being pleasing to the eye.

A conventional light-emitting heat-dissipating fan essentially comprises a heat-dissipating fan and a plurality of light-emitting elements annularly disposed at the heat-dissipating fan. Alternatively, the conventional light-emitting heat-dissipating fan essentially comprises a heat-dissipating fan, a plurality of light-emitting elements disposed at the corners of the heat-dissipating fan, and a light guide tube for scattering light emitted from the light-emitting elements. But the prior art has a drawback: the light-emitting elements have to be received in receiving recesses or holes of the heat-dissipating fan and thus are limited in quantity. For instance, when delivered, the heat-dissipating fan comes with just four receiving recesses for receiving the light-emitting elements; as a result, a maximum of four light-emitting elements will, and may, be mounted on the heat-dissipating fan. Another drawback of the prior art is: in the situation where the conventional light-emitting heat-dissipating fan essentially comprises a plurality of light-emitting elements disposed at the corners of the heat-dissipating fan, and a light guide tube for scattering light emitted from the light-emitting elements to generate a halo, but the halo is monotonous. To make the halo capable of changing color, it is necessary to put plenty light-emitting elements on the heat-dissipating fan annularly; to this end, more receiving recesses or holes must be disposed on the heat-dissipating fan to the detriment of cost control and structural simplicity of the heat-dissipating fan.

SUMMARY OF THE INVENTION

It is an objective of the present invention to provide a ring-shaped light-emitting heat-dissipating fan which comprises a ring-shaped light guide. The ring-shaped light guide has an upper top surface, a ring-shaped flat region, which is designed to be flat, or the upper top surface is stepped. The upper top surface is intended to place a ring-shaped circuit board so that the ring-shaped circuit board can be directly placed on the ring-shaped flat region flatly. Hence, the present invention dispenses with additional components which are otherwise required to fix the ring-shaped circuit board to the ring-shaped light guide. Furthermore, the ring-shaped light-emitting heat-dissipating fan is characterized in that a plurality of light-emitting elements is annularly disposed on the ring-shaped circuit board, and that the ring-shaped flat region dispenses with any receiving recesses which are otherwise required for receiving the light-emitting elements, so as to customize the required quantity of the light-emitting elements and thus dispense with the need to change the original design of the ring-shaped flat region.

Another objective of the present invention is to provide a ring-shaped light-emitting heat-dissipating fan characterized in that a ring-shaped circuit board disposed on the ring-shaped light guide controls the light emission cycle and the color of light emitted from light-emitting elements annularly disposed on the ring-shaped circuit board, and that the ring-shaped light guide and the light-emitting elements jointly enable the ring-shaped light-emitting heat-dissipating fan to display a colorful, variable halo, thereby enhancing the beauty of the ring-shaped light-emitting heat-dissipating fan.

Yet another objective of the present invention is to provide a ring-shaped light-emitting heat-dissipating fan characterized in that a lateral hole is disposed on the ring-shaped light-emitting heat-dissipating fan laterally such that the ring-shaped light guide is partially exposed from the lateral hole to allow both an inner lateral surface and an outer lateral surface of the ring-shaped light-emitting heat-dissipating fan to emit light, thereby enhancing user visual experience.

In order to achieve the above and other objectives, the present invention provides a ring-shaped light-emitting heat-dissipating fan which comprises: a base having a ring-shaped frame and a pivot portion; a fan pivotally disposed at the pivot portion; a ring-shaped light guide having an upper top surface, a lower top surface, an inner lateral surface, and an outer lateral surface; a lid disposed on the ring-shaped frame, with the ring-shaped light guide disposed between the base and the lid, and a receiving space formed between the lid and the ring-shaped light guide; and a ring-shaped circuit board disposed on an upper top surface of the ring-shaped light guide in the receiving space and having thereon a plurality of light-emitting elements arranged annularly.

In an embodiment of the present invention, the upper top surface of the ring-shaped light guide is stepped to form a ring-shaped flat region, with the ring-shaped circuit board disposed on the ring-shaped flat region, and an outer lateral surface of the ring-shaped light guide has a lesser width than an inner lateral surface of the ring-shaped light guide.

In an embodiment of the present invention, the ring-shaped light-emitting heat-dissipating fan further comprises a lateral hole disposed between the lid and the ring-shaped frame of the base.

In an embodiment of the present invention, the ring-shaped circuit board has a control unit for controlling color of light emitted from the light-emitting elements and a light emission cycle of the light-emitting elements.

In an embodiment of the present invention, the light-emitting elements annularly disposed on the ring-shaped circuit board face the ring-shaped flat region.

In an embodiment of the present invention, the ring-shaped light guide is transparent or translucent.

In an embodiment of the present invention, the base has a plurality of latches, the lid has a plurality of slots, the latches being engaged with the slots, allowing the ring-shaped light guide and the ring-shaped circuit board to be mounted in place between the base and the lid.

In an embodiment of the present invention, the light-emitting units are light-emitting diodes.

In an embodiment of the present invention, the ring-shaped circuit board is a flexible printed circuit.

Therefore, a ring-shaped light-emitting heat-dissipating fan of the present invention is characterized in that: an upper top surface of a ring-shaped light guide is designed to be flat such that a ring-shaped circuit board can be placed on the upper top surface. A receiving space is formed between a lid and the ring-shaped light guide so that the ring-shaped circuit board can be directly placed on the ring-shaped flat region to dispense with any additional component which is otherwise required to fix the ring-shaped circuit board to the ring-shaped light guide. The ring-shaped light-emitting heat-dissipating fan is further characterized in that a lateral hole is disposed on the ring-shaped light-emitting heat-dissipating fan laterally such that the ring-shaped light guide is partially exposed from the lateral hole to allow both an inner lateral surface and an outer lateral surface of the ring-shaped light-emitting heat-dissipating fan to emit light, thereby enhancing user visual experience. The upper top surface of the ring-shaped light guide is stepped to form a ring-shaped flat region, with the ring-shaped circuit board disposed on the ring-shaped flat region. The width of the outer lateral surface of the ring-shaped light guide is less than the width of the inner lateral surface of the ring-shaped light guide so that the inner lateral surface has a larger light-emitting area than the outer lateral surface. Furthermore, the ring-shaped light-emitting heat-dissipating fan is characterized in that a plurality of light-emitting elements is annularly disposed on the ring-shaped circuit board, and that the ring-shaped flat region dispenses with any receiving recesses which are otherwise required for receiving the light-emitting elements, so as to customize the required quantity of the light-emitting elements and thus dispense with the need to change the original design of the ring-shaped flat region. Moreover, the ring-shaped circuit board disposed on the ring-shaped light guide controls the light emission cycle and the color of light emitted from the light-emitting elements annularly disposed on the ring-shaped circuit board. The ring-shaped light guide and the light-emitting elements jointly enable the ring-shaped light-emitting heat-dissipating fan to display a colorful, variable halo, thereby enhancing the beauty of the ring-shaped light-emitting heat-dissipating fan.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
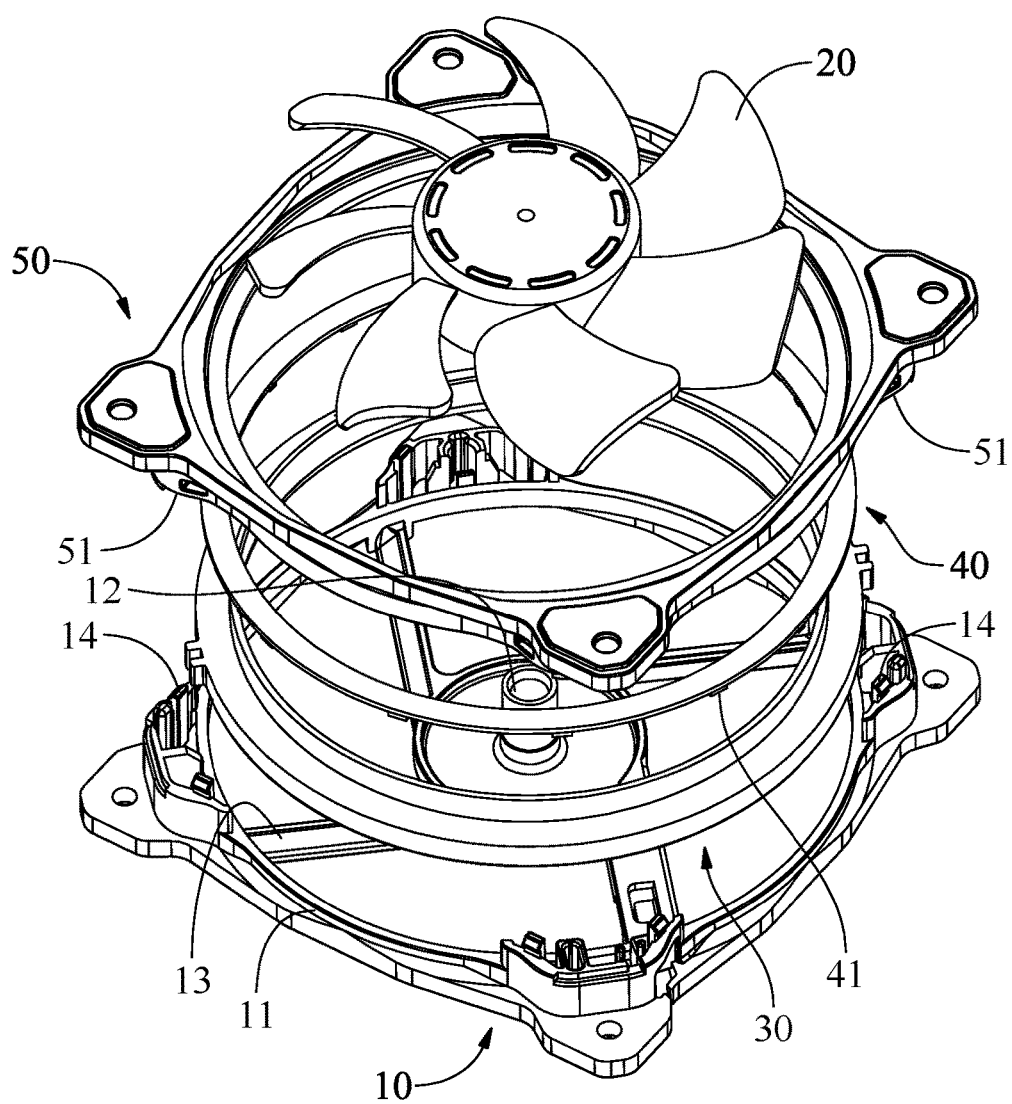
FIG. 1 is an exploded view of a ring-shaped light-emitting heat-dissipating fan according to an embodiment of the present invention.
Figure 2:
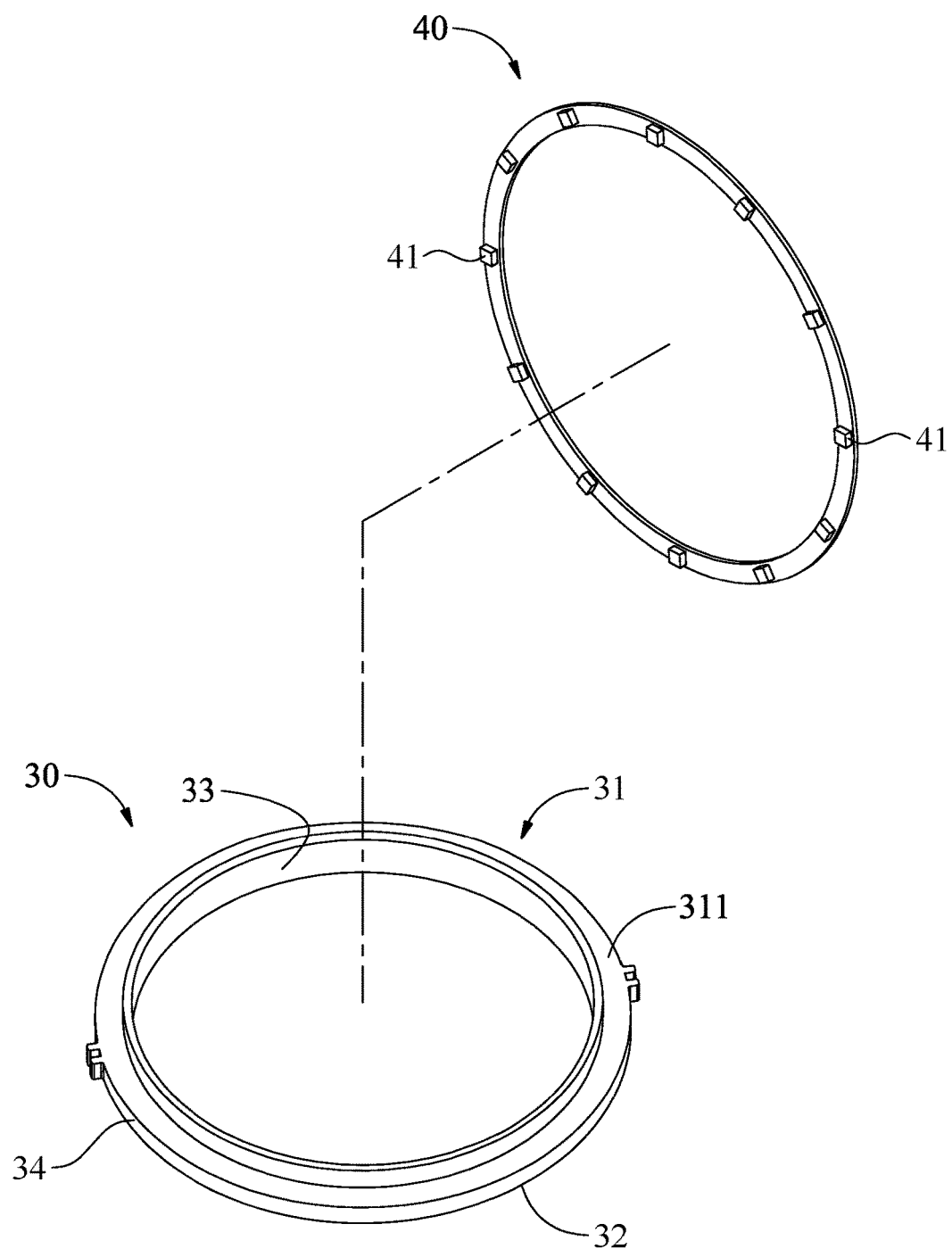
FIG. 2 is a perspective view of a ring-shaped light guide of the ring-shaped light-emitting heat-dissipating fan according to an embodiment of the present invention.
Figure 3:
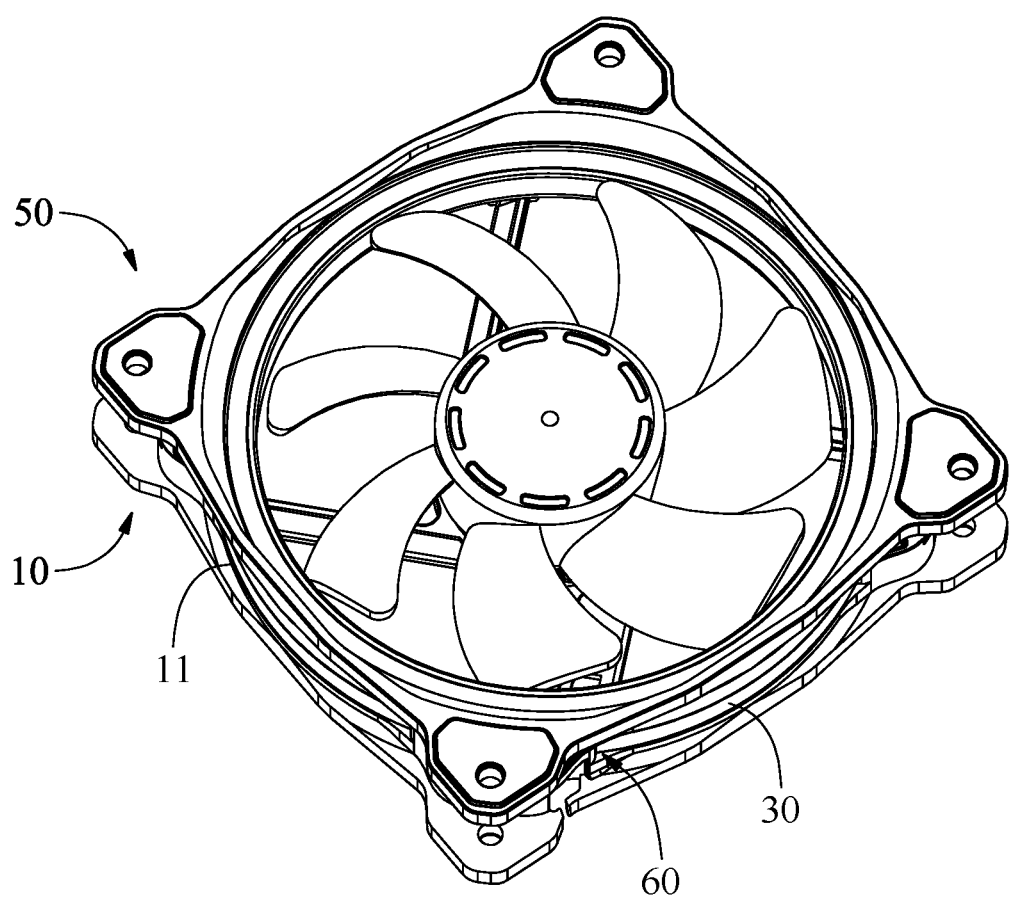
FIG. 3 is a perspective view of the ring-shaped light-emitting heat-dissipating fan according to an embodiment of the present invention.

FIG. 1 is an exploded view of a ring-shaped light-emitting heat-dissipating fan according to an embodiment of the present invention. FIG. 2 is a perspective view of a ring-shaped light guide of the ring-shaped light-emitting heat-dissipating fan according to an embodiment of the present invention. FIG. 3 is a perspective view of the ring-shaped light-emitting heat-dissipating fan according to an embodiment of the present invention.

Referring to FIG. 1, a ring-shaped light-emitting heat-dissipating fan 1 of the present invention comprises a base 10, a fan 20, a ring-shaped light guide 30, a ring-shaped circuit board 40, and a lid 50.

The base 10 has a ring-shaped frame 11 and a pivot portion 12. The pivot portion 12 is centrally disposed at the base 10. The pivot portion 12 is connected to the ring-shaped frame 11 through a plurality of ribs 13. The fan 10 is pivotally disposed at the pivot portion 12.

Referring to FIG. 2, the ring-shaped light guide 30 has an upper top surface 31, a lower top surface 32, an inner lateral surface 33, and an outer lateral surface 34. The upper top surface 31 is stepped to form a ring-shaped flat region 311. The ring-shaped circuit board 40 is disposed on the ring-shaped flat region 311. The outer lateral surface of the ring-shaped light guide 30 has a lesser width than the inner lateral surface of the ring-shaped light guide 30 to maximize the light-emitting area of the inner lateral surface of the ring-shaped light guide 30. The lower top surface 32 of the ring-shaped light guide 30 faces the base 10.

A plurality of light-emitting elements 41 is annularly disposed on the ring-shaped circuit board 40 in a manner to face the ring-shaped flat region 311. The light-emitting elements 41 are light-emitting diodes. The ring-shaped circuit board 40 further has a control unit (not shown). The control unit controls the color of light emitted from the light-emitting elements 41 and the light emission cycle of the light-emitting elements 41. The light-emitting elements 41 are RGB light-emitting diodes. The control unit controls variations in the color of light emitted from the light-emitting diodes to enable the light-emitting diodes to display variations in color. The control unit also controls the light emission cycle of each light-emitting diode in a manner similar to that of LED scrollers. Hence, the light-emitting diodes disposed on the ring-shaped circuit board 40 show different colors of light in different light emission cycles. In this embodiment, the ring-shaped circuit board 40 is a flexible printed circuit.

The lid 50 is disposed on the ring-shaped frame 11. The ring-shaped light guide 30 is disposed between the base 10 and the lid 50. A receiving space is formed between the lid 50 and the ring-shaped light guide 30. The ring-shaped circuit board 40 is disposed on the upper top surface of the ring-shaped light guide 30 in the receiving space. A plurality of latches 14 is disposed at the four corner of the base 10, respectively. A plurality of slots 51 is disposed at the four corner of the lid 50, respectively. The latches 14 are engaged with the slots 51, respectively, such that the ring-shaped light guide 30 and the ring-shaped circuit board 40 are mounted in place between the base 10 and the lid 50.

Referring to FIG. 3, it is a perspective view of the ring-shaped light-emitting heat-dissipating fan 1 assembled. A lateral hole 60 is disposed on one side of the ring-shaped light-emitting heat-dissipating fan 1 and between the lid 50 and the ring-shaped frame 11 of the base 10. A portion of the ring-shaped light guide 30 is exposed from the lateral hole 60. The quantity of the lateral holes 60 is subject to changes as needed, and thus it is feasible that the lateral holes 60 may be restricted to a specific one or specific ones of the four sides of the ring-shaped light-emitting heat-dissipating fan 1 or disposed on all the four sides of the ring-shaped light-emitting heat-dissipating fan 1.

In practice, a user puts the ring-shaped light-emitting heat-dissipating fan 1 of the present invention on a target device (not shown) which requires heat dissipation. After the ring-shaped light-emitting heat-dissipating fan 1 is connected to a power supply and turned on, the fan 20 turns and dissipates heat from the target device. After being supplied with power, the ring-shaped circuit board 40 has its control unit triggered to control the light-emitting elements 41 disposed on the ring-shaped circuit board 40 to emit white light during a light emission cycle. In this embodiment, the ring-shaped light guide 30 is made of a transparent or translucent material. Since the light-emitting elements 41 disposed on the ring-shaped circuit board 40 face the ring-shaped flat region 311, light emitted from the light-emitting elements 41 is directly admitted into the ring-shaped light guide 40 and reflected off the inner wall of the ring-shaped light guide 40 repeatedly. The light-guiding material of the ring-shaped light guide 30 guides the light to evenly scatter so as to provide a ring-shaped light source. Since the control unit controls the light-emitting elements 41 to emit white light, the user perceives the ring-shaped light source which displays different colors of the light emitted from the ring-shaped light guide 30. Referring to FIG. 3, the ring-shaped light guide 30 is partially exposed from the lateral hole 60, and the inner lateral surface 33 of the ring-shaped light guide 30 is inwardly exposed from the ring-shaped light-emitting heat-dissipating fan 1; hence, when the ring-shaped light-emitting heat-dissipating fan 1 is turned on to cause the light-emitting elements 41 to emit light, both the inner lateral surface and the outer lateral surface of the ring-shaped light-emitting heat-dissipating fan 1 emit light, thereby enhancing user visual experience. Since the width of the outer lateral surface of the ring-shaped light guide 30 is less than the width of the inner lateral surface of the ring-shaped light guide 30, the inner lateral surface has a larger light-emitting area than the outer lateral surface.

Therefore, a ring-shaped light-emitting heat-dissipating fan of the present invention is characterized in that an upper top surface of a ring-shaped light guide is designed to be flat such that a ring-shaped circuit board can be placed on the upper top surface. A receiving space is formed between a lid and the ring-shaped light guide so that the ring-shaped circuit board can be directly placed on the ring-shaped flat region to dispense with any additional component which is otherwise required to fix the ring-shaped circuit board to the ring-shaped light guide. The ring-shaped light-emitting heat-dissipating fan is further characterized in that a lateral hole is disposed on the ring-shaped light-emitting heat-dissipating fan laterally such that the ring-shaped light guide is partially exposed from the lateral hole to allow both an inner lateral surface and an outer lateral surface of the ring-shaped light-emitting heat-dissipating fan to emit light, thereby enhancing user visual experience. The upper top surface of the ring-shaped light guide is stepped to form a ring-shaped flat region. The ring-shaped circuit board is disposed on the ring-shaped flat region. The width of the outer lateral surface of the ring-shaped light guide is less than the width of the inner lateral surface of the ring-shaped light guide so that the inner lateral surface has a larger light-emitting area than the outer lateral surface. Furthermore, the ring-shaped light-emitting heat-dissipating fan is characterized in that a plurality of light-emitting elements is annularly disposed on the ring-shaped circuit board, and that the ring-shaped flat region dispenses with any receiving recesses which are otherwise required for receiving the light-emitting elements, so as to customize the required quantity of the light-emitting elements and thus dispense with the need to change the original design of the ring-shaped flat region. Moreover, the ring-shaped circuit board disposed on the ring-shaped light guide controls the light emission cycle and the color of light emitted from the light-emitting elements annularly disposed on the ring-shaped circuit board. The ring-shaped light guide and the light-emitting elements jointly enable the ring-shaped light-emitting heat-dissipating fan to display a colorful, variable halo, thereby enhancing the beauty of the ring-shaped light-emitting heat-dissipating fan.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A ring-shaped light-emitting heat-dissipating fan, comprising:
   a base having a ring-shaped frame and a pivot portion;
   a fan pivotally disposed at the pivot portion;
   a ring-shaped light guide having an upper top surface, a lower top surface, an inner lateral surface, and an outer lateral surface;
   a lid disposed on the ring-shaped frame, with the ring-shaped light guide disposed between the base and the lid, and a receiving space formed between the lid and the ring-shaped light guide; and
   a ring-shaped circuit board disposed on an upper top surface of the ring-shaped light guide in the receiving space and having thereon a plurality of light-emitting elements arranged annularly;
   wherein the fan is disposed on the pivot portion and an opening of the lid and is separated from and surrounded by the ring-shaped circuit board and the inner lateral surface of the ring-shaped light guide;
   wherein the upper top surface of the ring-shaped light guide is stepped to form a ring-shaped flat region, with the ring-shaped circuit board disposed on the ring-shaped flat region, and an outer lateral surface of the ring-shaped light guide has a lesser width than an inner lateral surface of the ring-shaped light guide;
   wherein at least one lateral hole is disposed between the lid and the ring-shaped frame of the base such that a periphery of the ring-shaped light guide is partially exposed from the at least one lateral hole; the inner lateral surface of the ring-shaped light guide is inwardly exposed from the ring-shaped light-emitting heat-dissipating fan;
   wherein the inner lateral surface and the outer lateral surface of the ring-shaped light-emitting heat-dissipating fan emit light when the ring-shaped light-emitting heat-dissipating fan is turned on to cause the light-emitting elements to emit light.

2. The ring-shaped light-emitting heat-dissipating fan of claim 1, wherein the ring-shaped circuit board has a control unit for controlling color of light emitted from the light-emitting elements and a light emission cycle of the light-emitting elements.

3. The ring-shaped light-emitting heat-dissipating fan of claim 1, wherein the light-emitting elements annularly disposed on the ring-shaped circuit board face the ring-shaped flat region.

4. The ring-shaped light-emitting heat-dissipating fan of claim 1, wherein the ring-shaped light guide is transparent or translucent.

5. The ring-shaped light-emitting heat-dissipating fan of claim 1, wherein the base has a plurality of latches, the lid has a plurality of slots, the latches being engaged with the slots, allowing the ring-shaped light guide and the ring-shaped circuit board to be mounted in place between the base and the lid.

6. The ring-shaped light-emitting heat-dissipating fan of claim 1, wherein the light-emitting units are light-emitting diodes.

7. The ring-shaped light-emitting heat-dissipating fan of claim 1, wherein the ring-shaped circuit board is a flexible printed circuit.

* * * * *